United States Patent

Stafford, Jr.

[15] 3,645,559
[45] Feb. 29, 1972

[54] TRAILER HAVING GOOSENECK AND BOGIE CONNECTED SELECTIVELY TO EACH OTHER AND TO CARGO UNIT

[72] Inventor: George T. Stafford, Jr., P.O. Box 2805, Birmingham, Ala. 35212

[22] Filed: Apr. 24, 1970

[21] Appl. No.: 31,658

[52] U.S. Cl............................280/415 B, 214/512, 214/390, 280/423 B, 280/425 A
[51] Int. Cl......................................................B62d 53/08
[58] Field of Search...............214/390, 512, 506; 280/415 B, 280/423 B, 425 A

[56] References Cited

UNITED STATES PATENTS

| | | | |
|---|---|---|---|
| 3,505,767 | 4/1970 | Fyle, Jr.................................. | 280/415 B |
| 3,156,484 | 11/1964 | Talbert................................ | 214/390 X |
| 3,520,430 | 7/1970 | Dunbar................................ | 214/512 X |
| 2,531,694 | 11/1950 | Larsen.................................. | 214/506 |
| 3,450,417 | 6/1969 | Cramer et al....................... | 214/506 X |

Primary Examiner—Albert J. Makay
Attorney—Jennings, Carter & Thompson

[57] ABSTRACT

Apparatus connecting gooseneck and bogie selectively to each other and to cargo unit. Support members extend rearwardly from gooseneck and forwardly from bogie and detachably connected to adjacent portions of cargo unit. Connector member carried by bogie and connectable to support members.

2 Claims, 3 Drawing Figures

Patented Feb. 29, 1972
3,645,559
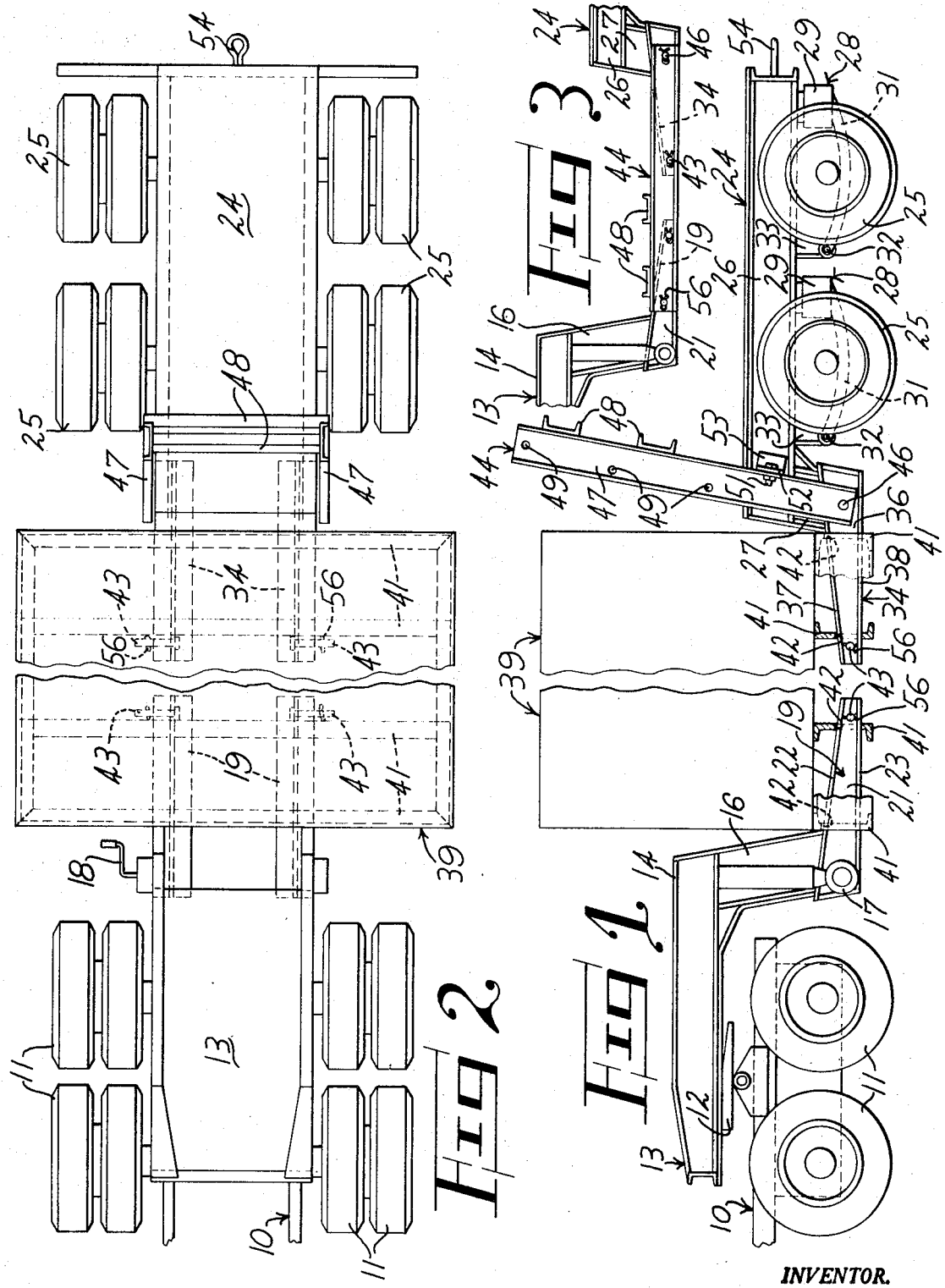
INVENTOR.
George T. Stafford Jr.
BY
Jennings, Carter, & Thompson
Attorneys 3,645,559

TRAILER HAVING GOOSENECK AND BOGIE CONNECTED SELECTIVELY TO EACH OTHER AND TO CARGO UNIT

BACKGROUND OF THE INVENTION

This invention relates to a trailer having a gooseneck drawbar and bogie section connected selectively to each other and to a cargo unit and more particularly to such apparatus which shall be particularly adapted for direct connection to a cargo unit, such as an air-conditioning unit, whereby the cargo unit becomes a composite section of the trailer while the cargo unit is being transported.

Heretofore in the art to which my invention relates, it has been the usual practice to transport heavy cargo units, such as air conditioning units and the like, by positioning such units on a flat bed trailer and then employing various types of securing means to prevent the unit from shifting relative to the bed. This not only consumes considerable time and effort in loading and unloading the cargo unit but requires the transport of a relatively long, empty trailer on the return trip made by the trailer.

BRIEF SUMMARY OF INVENTION

In accordance with my present invention, I provide apparatus for connecting a gooseneck drawbar and a bogie section selectively to each other and to a cargo unit whereby during transport of the cargo unit, the cargo unit is positioned between and secured rigidly to the drawbar and bogie section so that the cargo unit provides an intermediate section for the trailer. A connector member is carried by the bogie section and is adapted to be detachably connected to rearwardly extending support members carried by the drawbar and forwardly extending support members carried by the bogie section whereby the drawbar is connected directly to the bogie section while the support members are not connected to the cargo unit. Accordingly, while empty, the overall trailer unit is of a minimum length.

Apparatus embodying features of my invention is illustrated in the accompanying drawing, forming a part of this application, in which:

FIG. 1 is a side elevational view, partly broken away, showing the gooseneck drawbar and the bogie section connected to opposite ends of a cargo unit;

FIG. 2 is a top plan view, partly broken away, of the apparatus shown in FIG. 1; and, FIG. 3 is a fragmental, side elevational view showing the gooseneck drawbar connected directly to the bogie section by a connector member.

Referring now to the drawing for a better understanding of my invention, I show a fragment of a tractor 10 which is supported by wheels 11. The tractor 10 carries a conventional type fifth wheel 12 which is pivotally connected to a gooseneck drawbar indicated generally at 13. The gooseneck drawbar is provided with the usual forwardly extending portion 14 and a depending rear portion 16. The gooseneck drawbar is also provided with conventional type landing gear 17 which is adapted to engage the ground or other supporting surface whereby the rear end of the gooseneck drawbar is supported at selected elevations. The landing gear is moved to selected positions by suitable means, such as a handle unit 18. In view of the fact that the gooseneck drawbar and the landing gear therefor are components well known in the art to which my invention relates, no further description of this mechanism is deemed necessary.

Secured to and projecting rearwardly from the depending rear portion 16 of the drawbar 13 is a rearwardly extending support member 19. Preferably, the rearwardly extending support member 19 comprises laterally spaced arms which are secured to and extend rearwardly from the lower end of the depending portion 16. Each rearwardly extending support member 19 is shown as comprising a web portion 21 which is secured to the longitudinal center of upper and lower platelike members 22 and 23, respectively.

The bogie section for my improved trailer is indicated at 24 and is supported by wheels 25. The bogie section comprises a horizontal portion 26 which is connected at its forward end to a depending portion 27. The elevation of the horizontal portion 26 is adjusted relative to the ground or other supporting surface by adjustable suspension units 28 which are actuated by fluid under pressure, such as air. Each suspension unit 28 comprises an expandable member 29 which is connected at its lower end to an axle carrying member 31. The end of the axle carrying member 31 opposite the expandable member 29 is pivotally connected as at 32 to a depending bracket 33 carried by the horizontal frame 26. Since fluid pressure operated suspension units are well known in the art, no further description is given herein.

Secured to the forward end of the bogie section 24 is a forwardly extending support member 34. Preferably, the support member 34 comprises a pair of laterally spaced support arms, as shown in FIG. 2. Each support member 34 also comprises a web member 36 having upper and lower platelike members 37 and 38, respectively.

The cargo unit is indicated generally at 39 and may be in the form of an elongated air conditioner unit, or the like, which is provided with a rigid housing or frame members to form a rigid connecting structure between the drawbar 13 and the bogie section 24. In the drawing, the cargo unit 39 is shown as having depending, transverse frame members 41 secured to the under surface thereof. Openings 42 are provided in each of the transverse frame members 41, as shown in FIG. 1, for receiving the leg members 19 and 34 with a snug fit. Also, as shown in FIG. 1, the leg members 19 and 34 taper toward their free ends. Accordingly, the openings 42 in the innermost transverse frame members 41 are smaller and of a size to receive the adjacent surfaces of the members 19 and 34 with a close fit, as shown in FIG. 1, while the outermost openings 42 are larger in size and adapted to receive the adjacent surface of the arms 19 and 34 with a close fit, as shown. To restrain outward movement of the leg members 19 and 34 relative to the frame members 41, a transverse lock bolt 43 extends through a suitable opening in each of the leg members 19 and 34 inwardly of the innermost transverse frame member 42 in position to engage the inner surface of the innermost frame members 41. Accordingly, the support members 19 and 34 are positively secured to the cargo unit 39 whereby the drawbar 13 is connected to the bogie section 24.

When not employed to transport a cargo unit 39, the support members 19 and 34 are secured to each other by a connector member indicated generally at 44. The connector member 44 is pivotally connected to the bogie 24 adjacent the forward end thereof and preferably adjacent the rear portion of the forwardly extending support member 34 by a pivot pin 46. The other end of the connector member 44 is movable from the position shown in FIG. 1 to the position shown in FIG. 3 whereby it moves downwardly along opposite sides of the rearwardly extending support members 19. The connector member 44 comprises a pair of oppositely disposed channel members 47 which are connected to each other by suitable transverse, channellike frame members 48. Suitable openings 49 are provided in the channel members 47 for receiving bolt members 43, or the like, whereby the rearwardly extending support member 19 is secured rigidly to the forwardly extending support member 34. The connector bracket 47 is retained in the position shown in FIG. 1 by a bolt 51 which passes through an outwardly projecting flange 52 of a support bracket 53 which is carried by the bogie section 24, as shown in FIG. 1.

From the foregoing description, the operation of my improved apparatus will be readily understood. To transport a cargo unit 39, the operator moves the rearwardly extending arms 19 in position to register with the openings 42 provided in the frame members 41 of the cargo unit. Since the gooseneck 13 is provided with a landing gear unit 17, the operator can move the supporting arms 19 up or down and by releasing the fifth wheel 12 can drop the nose of the front assembly. Also, the suspension units 29 are deflated whereby the supporting arms 34 are moved into position to register with the adjacent openings 42 in the transverse frame members 41, as shown in FIG. 1. With the supporting arms 19 and 34 moved inwardly of the openings 42 to the position shown in FIG. 1, the locking bolts 43 are inserted inwardly of the innermost transverse frame members 41 to thus positively lock the supporting arms 19 and 34 to the cargo unit 39. The gooseneck drawbar 13 and the bogie section 24 are then elevated to the position shown in FIG. 1 whereby the cargo unit 39 constitutes a composite part of the overall trailer as the cargo unit is being transported.

To remove the cargo unit 39 from the support arms 19 and 34, the support arms are lowered, as described hereinabove and the locking bolts 43 are removed whereby the drawbar 13 and bogie section 24 may be removed from the cargo unit 39. A suitable eye member 54 is carried by the rear end of the bogie section 24 to facilitate rearward movement thereof.

To transport the empty trailer, the bolt 51 is removed from the bracket 53 whereupon the connector member 47 is then pivoted downwardly to the position shown in FIG. 3. The locking bolts 43 are then inserted in the openings 49 and suitable aligned openings in the arms 19 and 34 whereby the connector member 47 connects the drawbar 13 rigidly to the bogie section 24 to thus greatly reduce the overall length of the empty trailer. Suitable cotter pins 56 retain the locking bolts 43 in place.

From the foregoing, it will be seen that I have devised an improved apparatus for connecting the gooseneck drawbar of a trailer to a bogie section thereof whereby the gooseneck and bogie may be connected selectively to each other and to a cargo unit for travel as an empty trailer or as a loaded trailer with the cargo unit forming an integral, intermediate section of the trailer.

While I have shown my invention in but one form, it will be obvious to those skilled in the art that it is not so limited, but is susceptible of various other changes and modifications without departing from the spirit thereof.

What I claim is:

1. In apparatus for connecting a gooseneck drawbar and a bogie section selectively to each other and to a cargo unit with said drawbar having a forwardly extending portion adapted to be connected to the fifth wheel of a tractor and a depending rear portion,
   a. laterally spaced, rearwardly extending support arms secured to and projecting rearwardly from said depending rear portion of said drawbar with each rearwardly projecting arm tapering toward the rear end thereof,
   b. laterally spaced, forwardly extending support arms secured to and projecting forwardly from said bogie section of said trailer bed with each forwardly projecting arm tapering toward the forward end thereof,
   c. depending fore and aft pairs of transverse frame members, carried by front and rear under surfaces of said cargo unit with said frame members of each said pair being spaced from each other lengthwise of said cargo unit,
   d. there being aligned openings through said fore and aft pairs of transverse frame members for receiving said rearwardly extending support arms and said forwardly extending support arms respectively, with the openings in the innermost frame members being smaller than the openings in the outermost frame members so that said openings receive the tapered arms with a close fit,
   e. locking means detachably securing said rearwardly extending support arms and said forwardly extending support arms to said transverse frame members, and
   f. a connector member carried by said bogie section detachably connecting said forwardly extending support arms to said rearwardly extending support arms while said support arms are not connected to said transverse frame members.

2. Apparatus as defined in claim 1 in which said connector member comprises:
   a. an elongated frame member pivotally connected at one end adjacent said forwardly extending support arms with the other end of said elongated frame member being connected selectively to said rearwardly extending support arms and said bogie section.

* * * * *